(12) United States Patent
Felchner et al.

(10) Patent No.: US 8,231,475 B2
(45) Date of Patent: Jul. 31, 2012

(54) CV JOINT WITH MECHANICALLY EFFICIENT ASSEMBLY PROPERTIES

(75) Inventors: Christian Felchner, Wuppertal (DE); Uwe Thiele, Kreuzau (DE); Karl-Heinz Simons, Merzenich (DE)

(73) Assignee: Neapco Europe GmbH, Duren (DE)

( * ) Notice: Subject to any disclaimer, the term of this patent is extended or adjusted under 35 U.S.C. 154(b) by 0 days.

(21) Appl. No.: 13/196,015

(22) Filed: Aug. 2, 2011

(65) Prior Publication Data

US 2012/0040764 A1 Feb. 16, 2012

Related U.S. Application Data

(63) Continuation of application No. PCT/EP2010/051149, filed on Feb. 1, 2010.

(30) Foreign Application Priority Data

Feb. 2, 2009 (DE) .......................... 10 2009 000 561

(51) Int. Cl.
*F16D 3/205* (2006.01)
(52) U.S. Cl. ........................................ 464/111; 464/905
(58) Field of Classification Search .................. 464/111, 464/123, 124, 132, 905
See application file for complete search history.

(56) References Cited

U.S. PATENT DOCUMENTS

| | | |
|---|---|---|
| 7,083,522 B2 | 8/2006 | Bongartz |
| 7,137,895 B2 * | 11/2006 | Ishijima et al. ............... 464/111 |

FOREIGN PATENT DOCUMENTS

| | | |
|---|---|---|
| DE | 4327606 A1 | 2/1995 |
| DE | 10015957 A1 | 10/2000 |
| DE | 10325116 A1 | 1/2005 |
| DE | 102008013573 A1 | 9/2009 |
| EP | 0790425 A1 | 8/1997 |
| EP | 1286069 A1 | 2/2003 |
| EP | 1413787 A2 | 4/2004 |
| WO | 2007088955 A1 | 8/2007 |
| WO | 2007132963 A1 | 11/2007 |
| WO | 2008080439 A1 | 7/2008 |
| WO | 2010086434 A1 | 8/2010 |

OTHER PUBLICATIONS

International Search Report of PCT/EP2010/051159 mailed Jun. 5, 2010; 6 pages.
International Search Report of PCT/EP2010/051149 mailed May 10, 2010; 6 pages.

* cited by examiner

*Primary Examiner* — Gregory Binda
(74) *Attorney, Agent, or Firm* — Summa, Additon & Ashe, P.A.

(57) ABSTRACT

The constant velocity pivot joint includes an outer joint part (12), an inner joint part (14) and rollers (28) disposed between the outer joint part (12) and the inner joint part (14). The rollers (28) each comprise an inner ring (48) with an inner roller surface (54) and an outer ring (42) with an outer roller surface (56). A plurality of rolling members (46) is disposed between the inner ring (48) and outer ring (42) so that the outer ring (42) can roll off on the inner ring (48). The inner ring (48) forms an axial guide, which fixes the position of the rolling members (46) relative to the inner ring (48) in the axial direction. Furthermore, an inner ring (48) and the outer ring (42) are axially displaceable relative to each other to a limited extent.

19 Claims, 8 Drawing Sheets

PRIOR ART

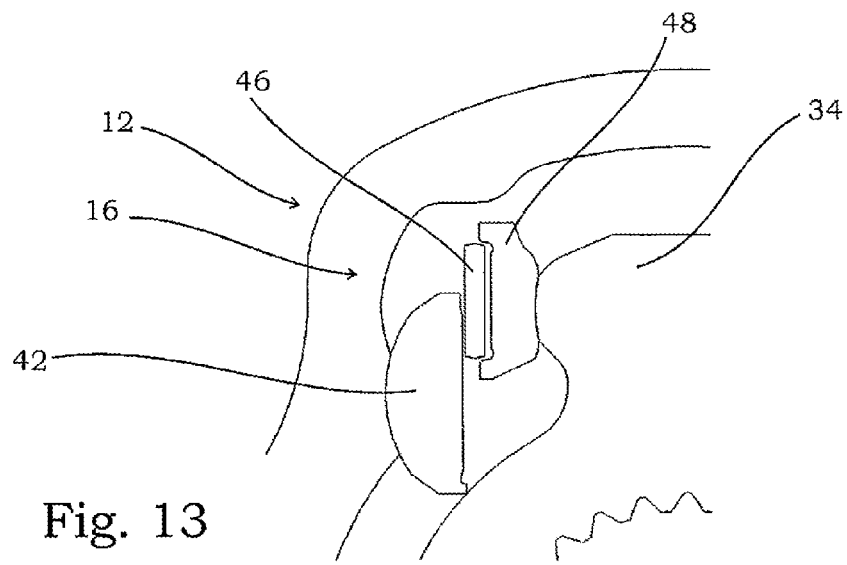
Fig. 13
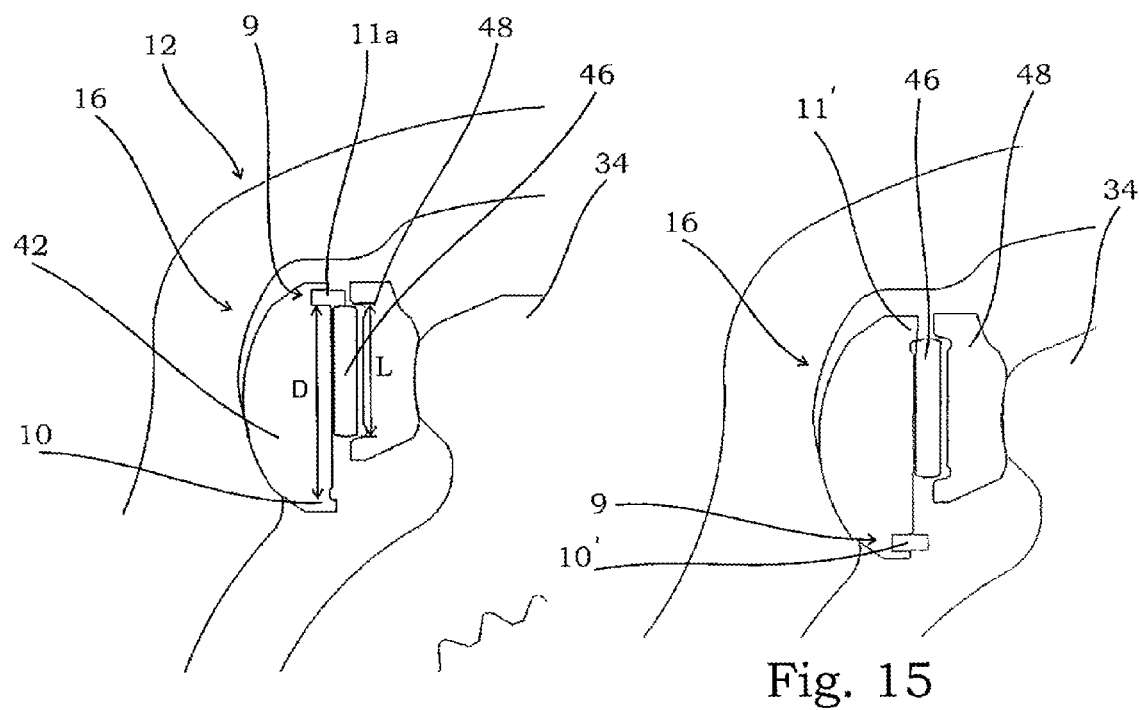
Fig. 14
Fig. 15

CV JOINT WITH MECHANICALLY EFFICIENT ASSEMBLY PROPERTIES

This nonprovisional application is a continuation of International Application No. PCT/EP2010/051149, which was filed on Feb. 1, 2010, and which claims priority to German Patent Application No. DE 10 2009 000 561.7, which was filed in Germany on Feb. 2, 2009, and which are all herein incorporated by reference.

BACKGROUND OF THE INVENTION

The present invention relates to constant velocity pivot joints having the features of the generic portion of the main claims. Such constant velocity pivot joints, which are intended for example for use in motor vehicles, are also known as homokinetic pivot joints.

BRIEF DESCRIPTION OF RELATED ART

A generic constant velocity pivot joint is known from DE 103 25 116 A1, which in turn is based on a generic constant velocity pivot joint known from DE 102 06 733 A1. The disclosure of these two patent applications is hereby adopted by reference in its entirety as the disclosure of this application. The constant velocity pivot joint disclosed in the first specification has a bell-shaped outer joint part with three guideways distributed over the circumference and extending in the axial direction. An inner joint part with three pivot pins, which are distributed over the circumference and extend in the radial direction and comprise a roller bearing surface, is disposed therein. The pivot pins are provided to come into engagement with the guideways in the outer joint part. For this purpose, so-called rollers are disposed between the outer joint part and the inner joint part, with each roller comprising an inner ring with an inner roller surface, the shape of which is adapted to the roller bearing surface of the pivot pins in such a way that a pivot pin of the inner joint part inserted into the inner ring can execute a tilting movement in the inner ring, but not a linear displacing movement. Furthermore, a roller comprises an outer ring with an outer roller surface, the shape of which is adapted to the guideways of the outer joint part in such a way that an outer ring inserted into a guideway can execute a linear displacing movement therein, but not a tilting movement.

BRIEF SUMMARY OF THE INVENTION

Two radially outwardly extending circumferential flanges are formed on the inner ring. A set of rolling members, such as needle bearings, is placed between these circumferential flanges. The rolling members roll off on the cylindrical outer surface of the inner ring. In this case, the distance between the circumferential flanges in the axial direction substantially corresponds to the length L of the rolling members. The outer ring of the roller forms a cylindrical inner surface on which the rolling members roll off. The thickness of the outer ring in the axial direction, in particular the width of the cylindrical inner surface is in this case much larger than the length L. This design permits a relatively large axial displacement or offset between the inner ring and the outer ring of the roller, with the inner ring, due to the design, and independent from the tilt on the pivot pin bearing it as well as independent from the position of the outer ring within the guideway, always being in contact with the rollers over their entire length L. This type of roller is referred to as "dynamic bearing" in the context of the present invention, and has proved itself in many cases in practical use.

The design known from DE 103 25 116 A1 realizes particular advantages with regard to low friction and vibration-free operation of the constant velocity pivot joint. However, the design known from the above-mentioned application has drawbacks with regard to its assembly if the constant velocity pivot joint is supposed to be delivered not in a completely pre-assembled state, but if the inner joint part is rather to be mounted in the outer joint part, for example, only during the final assembly of the motor vehicle. Since the rollers can be pivoted on the pins of the inner joint part, and furthermore since the outer rings of the rollers can be axially displaced relative to the inner rings, a defined assembly position of the pre-assembled inner joint part including the rollers supported by the pins cannot be ensured. Rather, in the design known from DE 103 25 116 A1, such states of the rollers frequently occur, with regard to the tilt angle and the axial displacement of the outer ring relative to the inner ring, which render an insertion of the rollers into the guideways of the outer joint part virtually impossible without manual correction of the angle or correction of the axial displacement of the outer ring relative to the inner ring. However, because of the number of the rollers to be adjusted—three per joint—and due to the adversely limited space available under the motor vehicle, such a manual correction is frequently virtually impossible.

This is where the invention comes in, which has set itself the object to propose a constant velocity pivot joint that enables a simplified final assembly of the joint within the context of the assembly in a motor vehicle or during the manufacture thereof, while maintaining the positive running properties of the aforementioned constant velocity pivot joint.

This object is achieved by a constant velocity pivot joint having the features of the independent claims. The dependent claims relate to advantageous embodiments which can be freely combined with one another within the context of what is technically feasible.

The present invention provides a constant velocity pivot joint comprising an outer joint part with three guideways distributed over the circumference and extending in the axial direction. An inner joint part with three pivot pins, which are distributed over the circumference and extend in the radial direction and comprise a roller bearing surface each, is disposed therein. The pivot pins are provided to come into engagement with the guideways. Rollers are disposed between the outer joint part and the inner joint part, with each roller comprising an inner ring with an inner roller surface, the shape of which is adapted to the roller bearing surface of the pivot pins in such a way that a pivot pin of the inner joint part inserted into the inner ring can execute a tilting movement therein, but not a linear displacing movement. Furthermore, the rollers comprise an outer ring with an outer roller surface, the shape of which is adapted to the guideways of the outer joint part in such a way that an outer ring inserted into a guideway can execute a roll-off movement therein, but not a tilting movement. A plurality of rolling members is disposed between the inner ring and the outer ring so that the outer ring can roll off on the inner ring. The entirety of the inner ring, outer ring and the rolling members is in this case also referred to as the roller of the constant velocity pivot joint.

The inner ring and the outer ring are axially displaceable relative to each other, with the inner ring forming an axial guide in a first embodiment, which fixes the position of the rolling members relative to the inner ring in the axial direction. In an alternative but equivalent embodiment, the outer ring forms an axial guide which fixes the position of the rolling members relative to the outer ring in the axial direction.

According to the invention, the ring of the roller that does not form the axial guide for the rolling members forms an inner displacement stop as well as an outer displacement stop which extend in the radial direction inwardly (embodiment on the outer ring) or outwardly (embodiment on the inner ring), respectively. The displacement stops limit the roll-off movement of the rolling members on the inner surface of the outer ring or the outer surface of the inner ring, respectively, in the axial direction. The axial displaceability of the outer ring relative to the inner ring is limited in this manner.

If the length of the rolling members is L and the distance of the inner displacement stop from the outer displacement stop in the axial direction is d, the axial displaceability of the outer ring relative to the inner ring is limited to the difference D, i.e.

$$D=d-L$$

On the one hand, the configuration according to the invention of inner and outer displacement stops prevents with certainty the roller from falling apart both during the final assembly of the constant velocity pivot joint as well as—in its assembled state—in the case of large articulation angles of the joint. On the other hand, it permits the limitation of the axial displaceability of the rollers of the joint to an amount that is required in practical use due to the maximum obtainable bending of the constant velocity pivot joint. The limitation of the axial displaceability of the roller enables a significant reduction of the manual position corrections on the rollers required when the inner joint part and the outer joint part are joined. This results in considerable advantages during the final assembly of the constant velocity pivot joint according to the invention within the context of mounting the joint in a motor vehicle, in particular during the production thereof.

Particular advantages are the result with regard to the wear resistance of the roller in which the inner and outer displacement stops are formed on the outer ring if at least one of the displacement stop, but preferably both, do not reach over the outer contour of the inner ring.

If, however, the inner and outer displacement stops are formed on the inner ring of the roller, it has proved to be advantageous if at least one of the displacement stops, but preferably both, do not reach over the inner contour of the outer ring.

In both cases, the stop(s), at a maximum displacement of the rings of the rollers relative to each other, rest(s) against the rotating rolling members and not against the other ring of the roller, which causes a significant reduction of friction occurring in the roller.

Particularly long operating life of the constant velocity pivot joint according to the invention can be realized by the inner ring being formed integrally, and not in parts. By suitably shaping the heads of the inner joint part as only partially spherical surfaces, a capability of the inner ring of being mounted on the heads of the inner joint part in a special mounting position can nevertheless be ensured.

In a preferred embodiment of the constant velocity pivot joint according to the invention, at least one of the inner displacement stop and the outer displacement stop is formed integrally with the ring of the roller on which they are disposed. In this case, a displacement stop can preferably be formed as, for example, an annular contact shoulder. Such a contact shoulder can be formed, for example, prior to the completion of processing of the inner or outer ring, such as during the forging of the ring or when it is machined. Alternatively, a displacement stop can be formed also after the completion of processing of the inner or outer ring, e.g. by plastic deformation of the ring concerned by means of crimping or caulking.

Alternatively, at least one of the inner displacement stop and the outer displacement stop can be formed as a separately formed circlip. The use of, for example, a spring ring which is inserted into a groove formed on the inner ring or outer ring, respectively, is conceivable. Also conceivable is the use of an annular disk that is pushed onto the cylindrical inner or outer surface of the outer or inner ring, respectively. The position of the annular disk can then be fixed by, for example, caulking. On one side, the annular disk can also be supported by a resting shoulder formed on the cylindrical surface.

Particular advantages with regard to the assembly of a constant velocity pivot joint according to the invention are obtained in another particularly preferred development. In this development, which can be combined individually or in combination with each of the above-described embodiments, the inner rings respectively supported on a pivot pin have a rest position in which the inner ring is mechanically fixed in a defined angular position relative to the pin axis. In particular, the axis of rotation R of the roller can in this case coincide with the pin axis Z; however, this is not an absolute requirement. In particular, this means that, in order to tilt an inner ring from its rest position relative to the pin axis Z, a defined minimum torque has to be applied at least once.

In a first preferred development of the invention, it is provided that the inner rings are elastically biased against tilting from the rest position, i.e. a defined minimum torque has to be overcome again for each tilting process from the rest position. This can be realized, for example, by means of a resilient means which can be disposed, for example, on the pin neck.

In an alternative second preferred development, it can also be provided that a defined minimum torque (tilting moment) has to be applied only once in order to tilt the inner rings from their respective rest position. Such a behavior can be caused by means that provide a mechanical barrier against tilting that is eliminated by a (substantially singular) plastic deformation of, for example, the roller bearing surface of the pivot pins or of the inner surface of the inner rings. Such a plastic deformation can occur, for example, when the vehicle is put into operation.

In a particularly preferred development, the above-mentioned minimum torque, which is to be applied once or permanently, is dependent upon the tilting direction of the inner ring relative to the pin axis. In this case, it can, for example, be provided that the torque required for tilting in a plane that is oriented in the direction of the pin axis and intersects the roller bearing surfaces of the pivot pin is significantly larger than the torque required for tilting in a plane that is also oriented in the pin axis but does not intersect the roller bearing surfaces.

Preferably, the above-mentioned means which mechanically fixes the inner ring in its rest position is disposed in the contact area between the inner ring and the pivot pin. Particularly preferably, the means comprises a circlip.

Alternatively or additionally, the means can comprise one or more geometrical structures that stand up in the contact area between the inner ring and the pivot pin from the roller bearing surfaces of the pivot pins and/or from the inner roller surfaces of the inner rings. Such geometrical structures can be produced, for example, by means of (local) plastic deformation of the pivot pins and/or of the inner rings, in particular subsequent to the inner rings being mounted onto the pivot pin. By way of example, mention is made herein of point-shaped local deformations (produced by means of a center punch) or even larger local deformations (produced by caulking).

Alternatively, such geometrical structures can be produced already during the forming of the pivot pins and/or of the inner rings, i.e., as a rule, prior to the inner rings being mounted on the pivot pin. In particular, such structures can be forged on or be produced by means of grinding.

Other features and advantages become apparent from the dependent claims and the exemplary embodiments, which are to be understood as not having a limiting effect and which will be explained below with reference to the drawings.

BRIEF DESCRIPTION OF THE SEVERAL VIEWS OF THE DRAWING

FIG. 13 shows a schematic representation of the practical difficulties that can occur when the inner joint part and the outer joint part are joined, FIG. 14 shows a schematic representation of a first constant velocity pivot joint according to the invention with a displacement-limited roller, FIG. 15 shows a schematic representation of a second constant velocity pivot joint according to the invention with a displacement-limited roller.

DETAILED DESCRIPTION OF THE INVENTION

Figure 2:
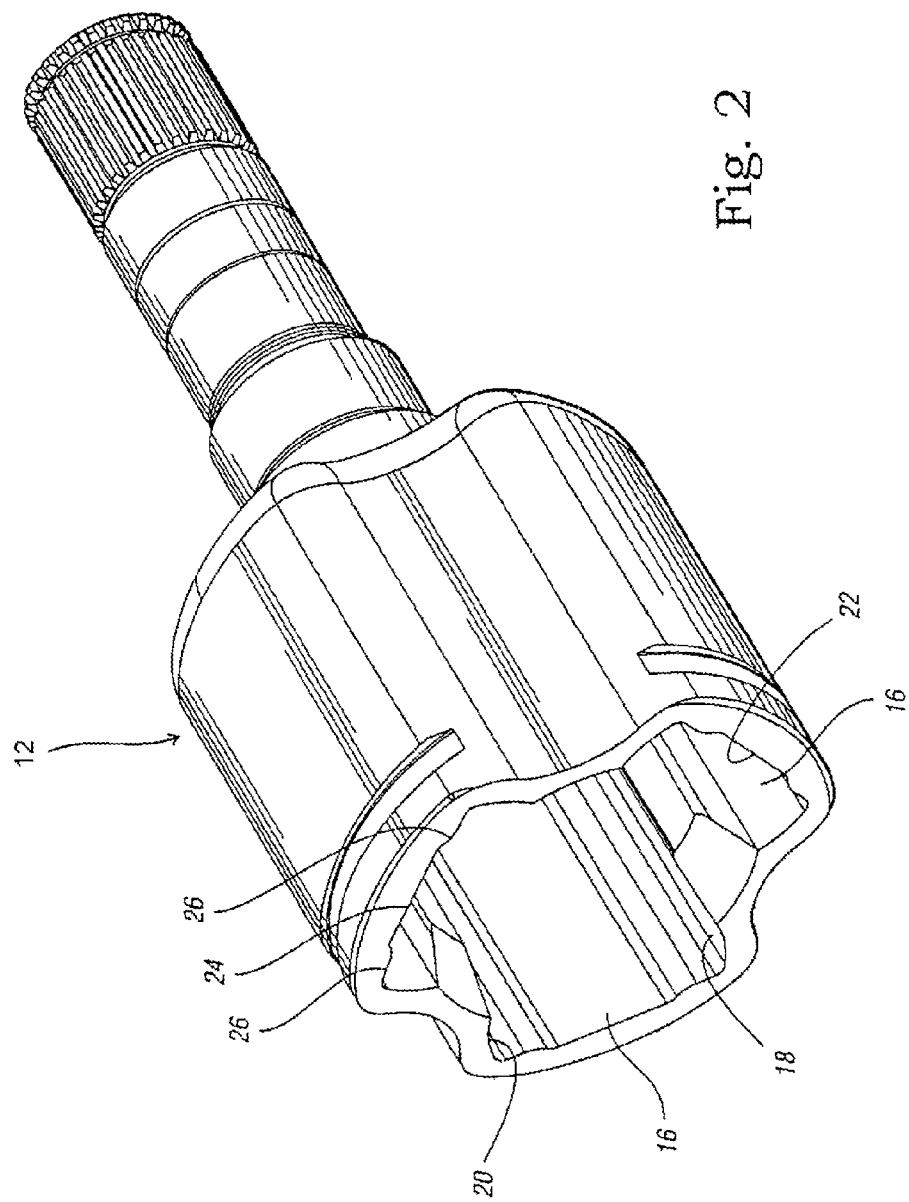
FIG. 2 shows a perspective view of the outer joint member of the known constant velocity pivot joint (a "tulip")
Figure 3:
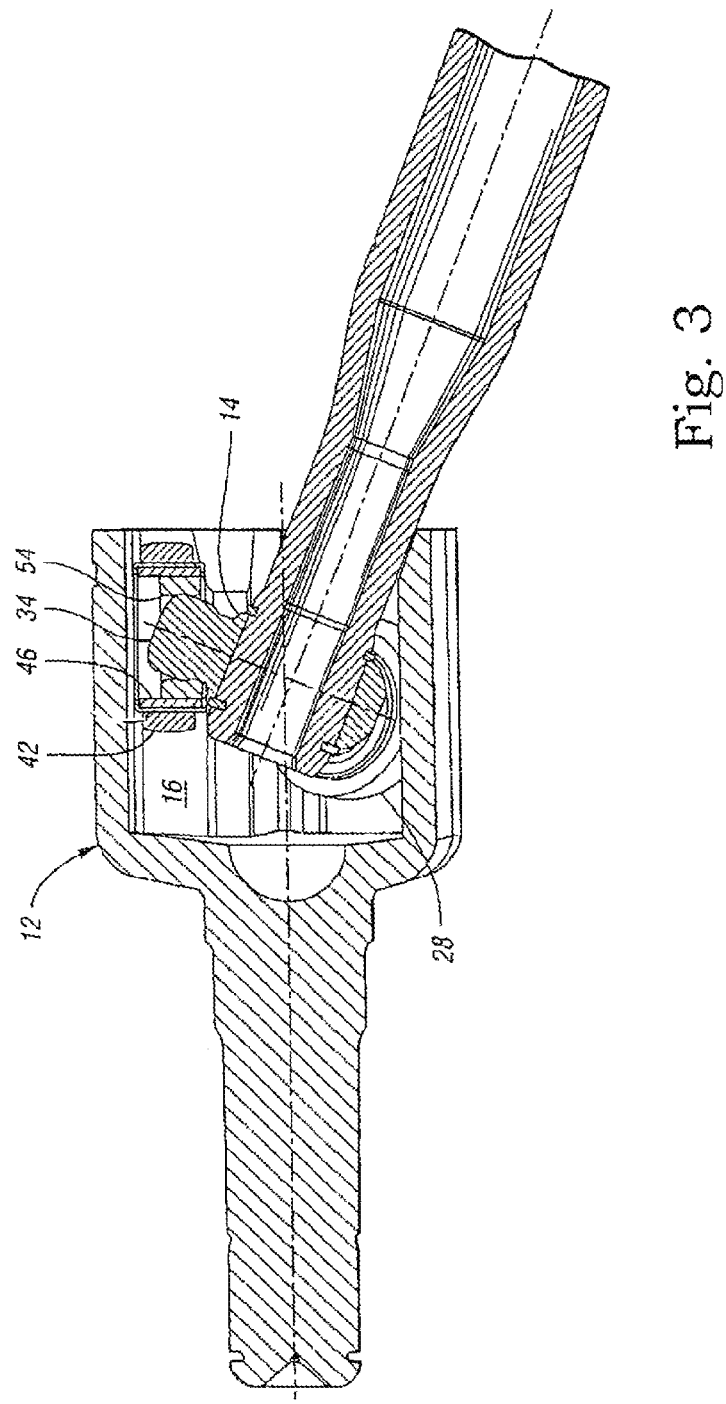
FIG. 3 shows a longitudinal section of the articulation of the known constant velocity pivot joint and of the pivoting process of the inner joint part within the roller.

Various embodiments of a constant velocity pivot joint according to the invention are described in conjunction with FIGS. 1 to 17. In this case, FIGS. 1 to 3 show the constant velocity pivot joint known from DE 102 06 733 A1, the structure of which is substantially identical—apart from the rollers of the joint—to that of the constant velocity pivot joint known from DE 103 25 116 A1 and of the constant velocity pivot joint according to the invention.

Figure 1:
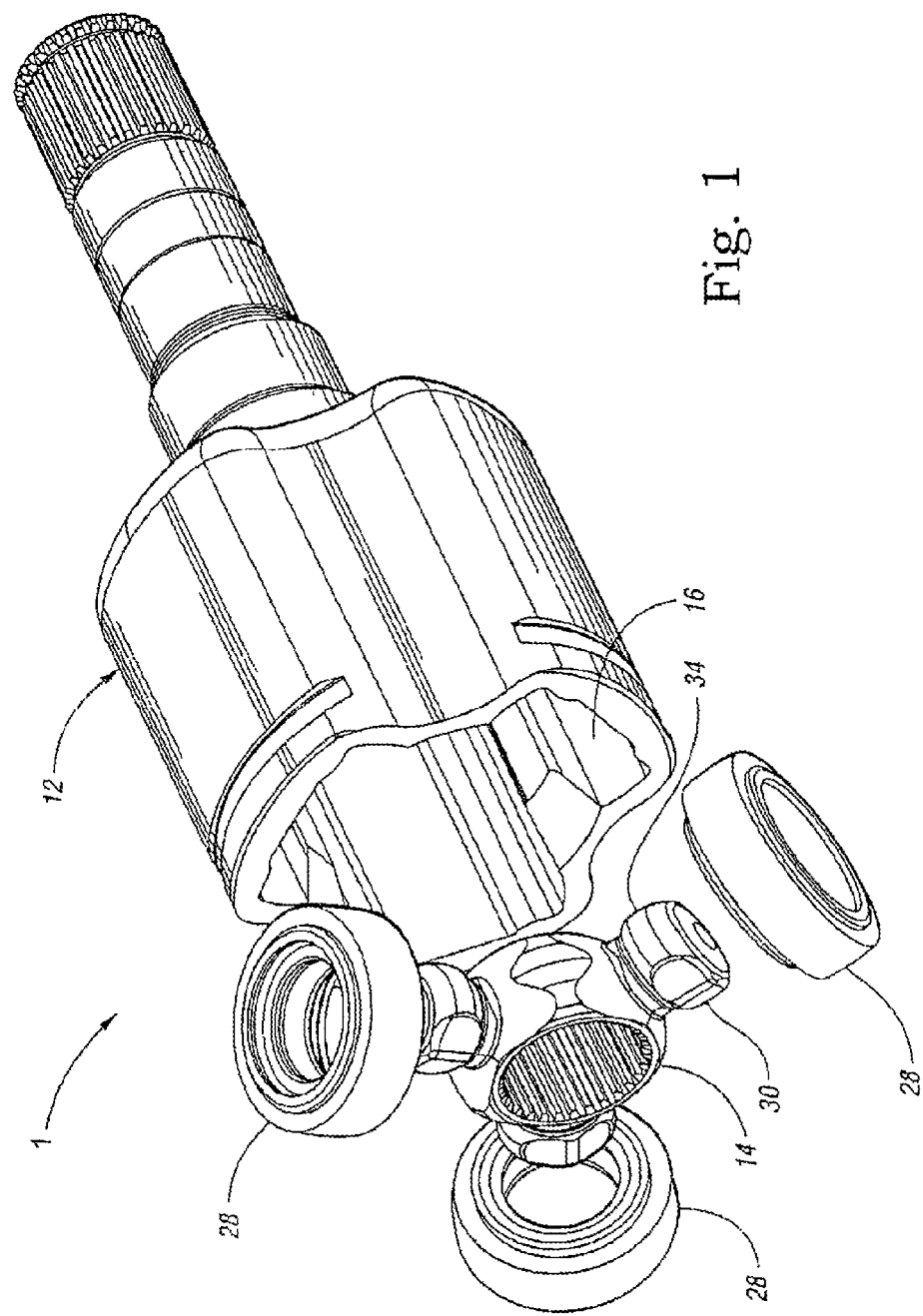
FIG. 1 shows an exploded perspective view of a known constant velocity pivot joint.

FIG. 1 shows an exploded perspective view of a known constant velocity pivot joint 1 with an outer joint part 12 and an inner joint part 14 configured as a tripod star. The outer joint part is shown separately in FIG. 2, whereas the tripod star 14 is shown separately in FIG. 4. A set of three elongate and axially extending guideways or running surfaces 16 are circumferentially formed within the cavity of the outer joint part 12. FIG. 3 shows a partial section of the outer joint part 12, the section extending in the longitudinal direction along the part. As can best be seen in FIG. 2, each guideway 16 comprises opposite inner surfaces or sides 18 and 20 and an outer end side or end face 22. In this exemplary embodiment, the inner sides 18 and 20 are configured so as to have a spherical or concave contour. The end face 22 is configured so as to have an upwardly protruding middle section 24. Due to the fact that the middle section 24 of the end face 22 protrudes upwardly, a shoulder surface 26 is advantageously formed which bears the top side of a roller 28 and limits a displacement of the roller 28 within the guideway 16. Furthermore, the upwardly protruding middle section 24 provides a lubricant channel for an optimum distribution of lubricating grease to the guideways 16 and bears surfaces in order to reduce the sliding and rolling contact friction, thereby reducing the joint plunger effect.

Figure 4:
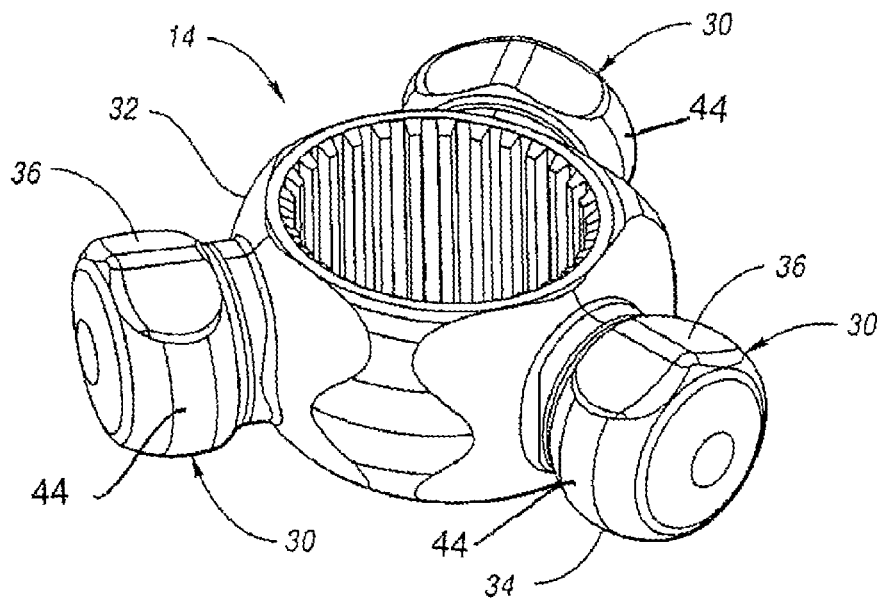
FIG. 4 shows a perspective view of the inner joint part of the present constant velocity pivot joint (a "tripod star")
Figure 5:
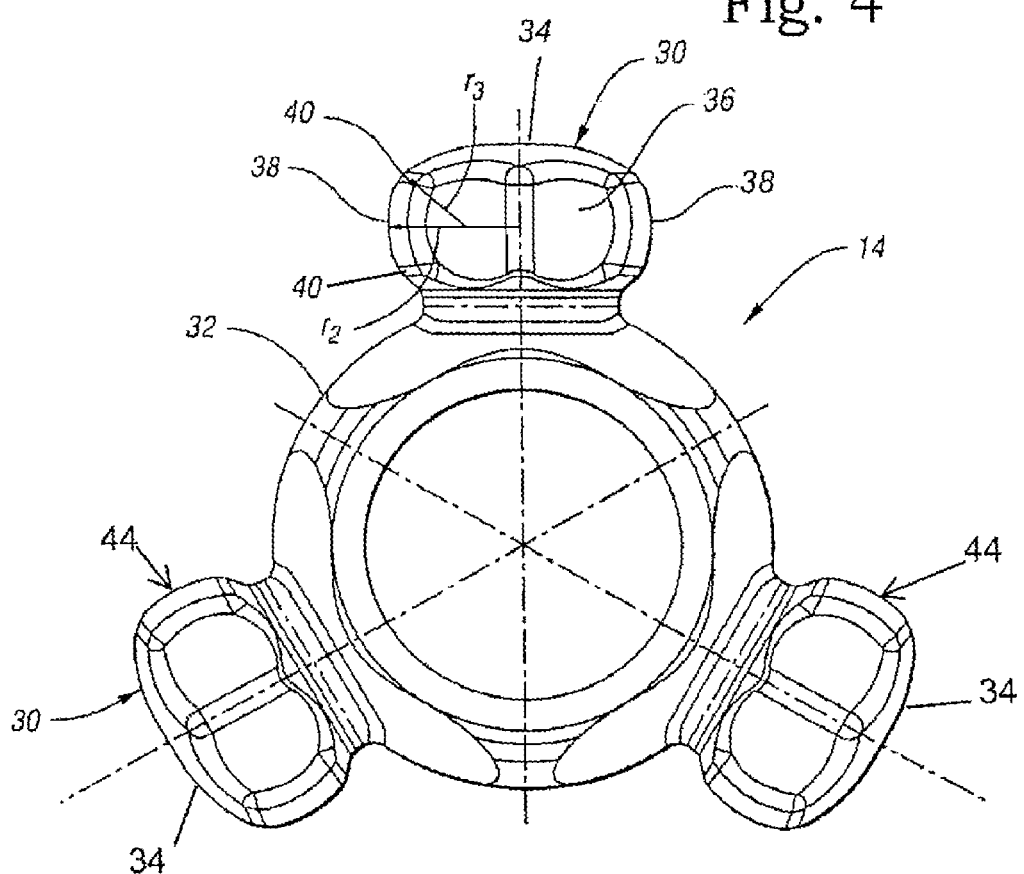
FIG. 5 shows a top view in the axial direction onto the tripod star from FIG. 4.

As is shown in FIGS. 4 and 5, the tripod star 14 comprises three axle pins 30 circumferentially disposed about a spider body 32. In the embodiment shown, each of the axle pins 30 forms on its free end a pivot pin 34 with a partially spherical roller bearing surface 44. As is explained below, the pivot pins 34 are disposed or designed so as to fit into a single-part inner ring 48' of a roller 28'. A set of cut-off or flattened surface sections 36 are formed in opposite areas of the outer pivot pin diameter in such a way that a lubricant channel is provided for better lubrication. Furthermore, the flattened surface sections 36 are configured such that it is possible to mount the single-part inner ring 48' on the pivot pin 34. This only requires that the inner ring 48 be tilted suitably relative to the pivot pin 34, as will be explained below in more detail.

As is best apparent from FIG. 5, the outer shape of the pivot pin 34 is formed by a spherical central area 38 with a radius r2. Upper and lower curved areas 40 extend up to the top side and down to the neck of the axle pin 30 with a smaller radius r3. As is shown in FIG. 3, the shape of the pivot pins 34 permits a tilting movement of the tripod star 14 relative to an inner ring of the roller 28 if the constant velocity pivot joint 1 is displaced in an articulated manner. In this case, the roller 28 remains in a suitable parallel orientation relative to the side walls 18, 20 of the guideways 16.

Figures 9, 10:
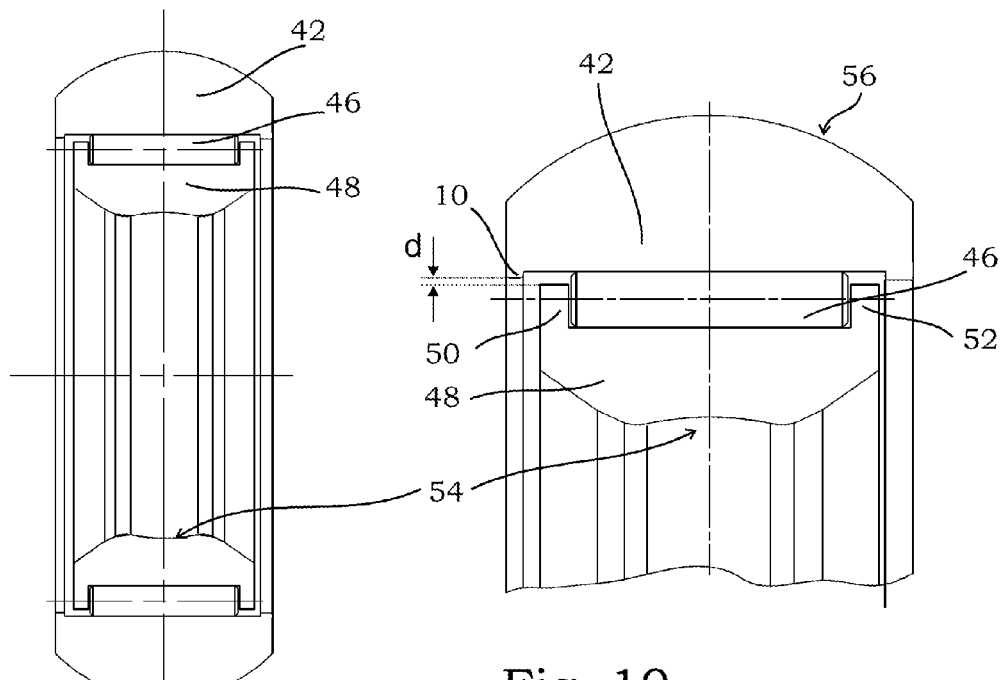
FIG. 9 shows a section through a roller according to the invention.
FIG. 10 shows a detailed view of the section from FIG. 9.
Figures 11, 12:
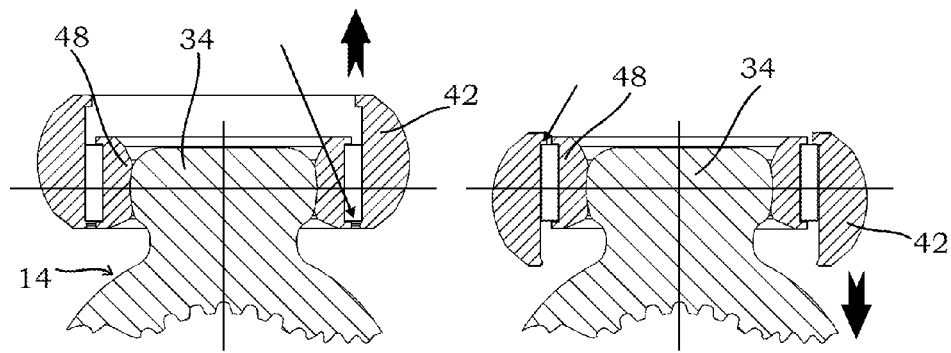
FIG. 11 shows a first detail from FIG. 7 in which the outer ring of the roller is in its outermost radial position.
FIG. 12 shows a second detail from FIG. 7 in which the outer ring of the roller is in its innermost radial position.

FIGS. 9 and 10 show a sectional view of the roller 28' of the constant velocity pivot joint 1 according to the invention. The roller comprises an outer ring 42' and an inner ring 48' between which a set of rolling members 46, such as rollers of a needle bearing, is disposed. In this case, the inner ring 48' forms two radially extending lower and upper flanges 50 and 52, which form an axial guide for the rolling members 46. This axial guide fixes the position of the rolling members 46 relative to the inner ring 48' in the axial direction, with the inner ring 48' bearing or supporting the rolling members 46 on its outer side.

As is shown in FIGS. 9 and 10, the thickness of the outer ring 42' is selected such that it exceeds the thickness of the inner ring 48' and the length of the rolling members 46. The outer ring 42' has a significantly greater thickness than the inner ring 48' in order to obtain a sufficient axial displacement path of the bearing rings relative to each other, with the inner ring 48' being supported on the rolling members 46 over its entire width within the guideway, independent from the fixed position of the outer ring 42'. According to the invention, the inner ring 48 is movable so that the inner ring 48' remains suitably positioned relative to the pivot pin 34 when the pivot pin 34 pivots therein.

Reference is now made again to FIGS. 7 and 8 in order to describe the mounting of a roller 28' on a pivot pin 34. A roller 28' is mounted on a roller bearing surface 44 of a pivot pin 34 of the tripod star 14 by aligning one side of the inner ring 48' with the outer side of the roller bearing surface 44 under a certain angle, and then by moving the opposite side of the inner ring 48 over the roller bearing surface 44 until the section with the smallest diameter of the inner ring 48' slips over the section with the largest diameter of the roller bearing surface 44. In other words, when the inner ring 48' is positioned at a certain angle, the opposite side exposes the outer radius of the pivot pin 34 and permits the entire inner ring 48' to be pushed or to slip over the pivot pin 34. After the inner ring 48' has been pushed over the section with the largest diameter of the pivot pin 34, the roller 28' is newly oriented in such a way that the inner ring 48' is not angled anymore at the special angle, with the curvature of the inner ring 48' leading to the roller 48 being retained on the pivot pin 34.

Figure 6:
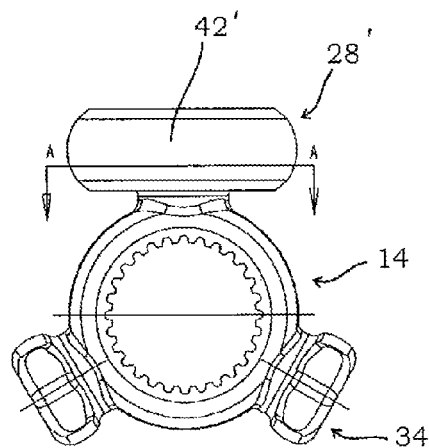
FIG. 6 shows a top view in the axial direction onto the inner joint part of a constant velocity pivot joint according to the invention with a mounted roller.

FIG. 6 shows the tripod star 14 of the constant velocity pivot joint 1 according to the invention in a top view with a roller 28' mounted on a pivot pin 34. This tripod star 14 with the roller 28 placed thereon is once again shown in a sectional view in FIG. 7. It is clearly apparent from this sectional view how the inner roller surface 54 of the roller 28' grasps around the roller bearing surface 44 of the pivot pin, with a limited tilting movement of the roller 28' relative to the axis of symmetry of the pivot pin 34 being possible. FIG. 8 once again shows a section through the axle pin 34 with the roller 28' from FIG. 6 placed thereon, the section having been carried out along a sectional plane extending through the section line A-A and standing perpendicularly on the paper plane. Once again, the radius r2 of the spherical central areas 38 of the ball pins 34 which form the roller bearing surfaces 44 can be seen. The lubricant channel between the pivot pin 34 and the roller 28' formed by the flattened surface sections 36 is also visible.

Figure 7:
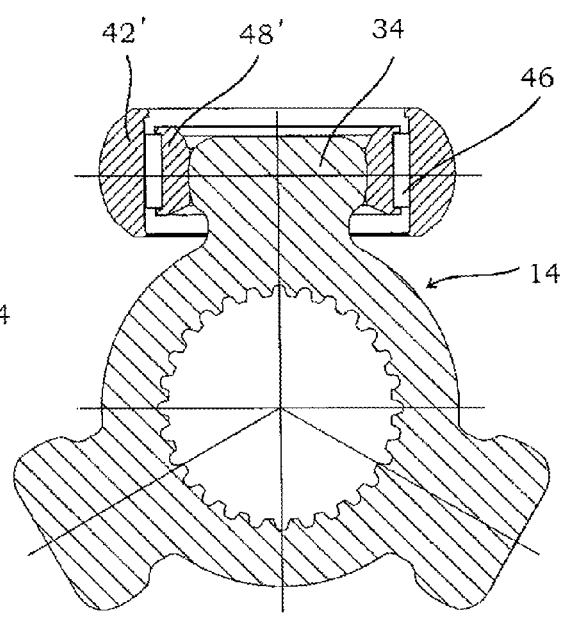
FIG. 7 shows a section perpendicular to the axial direction through the inner joint part and the mounted roller from FIG. 6.

FIG. 7 shows the mounted roller in its middle operating position, i.e. the inner ring 48' and the outer ring 42' lie one above the other in a substantially centered manner. According to the invention, the mounted roller is now also secured against falling apart even at maximum relative displacement of the inner ring 48' and the outer ring 42'. To this end, the outer ring 42' forms, at the side thereof opposite to the lower flange 50 of the inner ring 48', a stop 10, as can be seen from FIG. 10. This forms a resting portion for the rolling members 46 of the roller 28' against which they, in a first extreme position of the roller 28' apparent from FIG. 11, come to rest, thus preventing a further axial relative displacement of the bearing rings 42', 48' of the roller 28'. The mechanical contact point resulting therefrom is designated by the arrow in FIG. 11. The stop 10 secures the roller 28' against falling apart both during the final assembly of the constant velocity pivot joint 1 according to the invention as well as during its operation in an axial displacement direction.

In the assembled state of the constant velocity pivot joint 1 according to the invention, it, as well as the roller 28, is secured against falling apart also in the other axial displacement direction of the bearing rings 42, 48. This is done by means of a mechanical support of the outer ring 42 on the tripod star 14 as it can be seen in FIG. 12, marked by an arrow. Such a mechanical support can be formed by selecting suitable dimensions for the outer ring 42 and the tripod star 14.

The outer diameter of the inner ring 48 including the flanges 50, 52, which are approximately of equal length, is smaller than the inner diameter of the outer ring 42 including the stop 10, as can be seen in FIG. 10. A gap having the gap width d remains between the lower flange 50 and the stop 10. The gap width d is dimensioned such that the inner ring 48 without the inserted rolling members 46 can be freely passed through the outer ring 42 of the roller 28. A direct mechanical support of the bearing rings 42, 48 on each other, which would lead to a high degree of wear due to the relative rotational movement of the bearing rings 42, 48, is thus avoided. In the exemplary embodiment shown, the upper flange 50 and the lower flange 52 therefore serve exclusively for guiding the rolling members 46. Rather, the support takes place indirectly through the quickly rotating rolling members 46, whereby the friction and thus the wear can be significantly reduced.

In order to mount the roller 28 in accordance with the above exemplary embodiment, it has proved advantageous if the rolling member raceway of the inner ring 48 is filled with grease, into which the rolling members 46 are then pressed. Due to the grease filling, the rolling members 46 adhere on the inner ring 48 so that a simpler joining of the roller 28 is possible.

Figure 8:
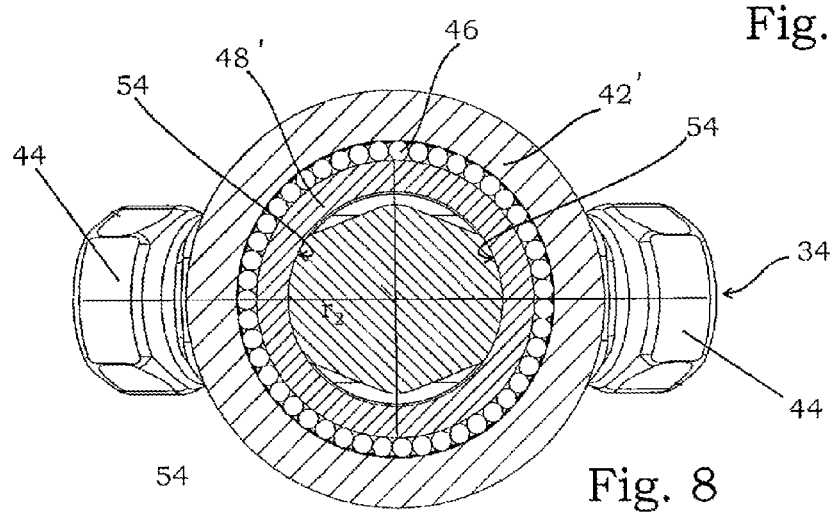
FIG. 8 shows a section perpendicular to the radial direction along the line A-A in FIG. 6 through the inner joint part and the mounted roller.

As is best apparent from FIGS. 8 and 9, each roller 28 uses a concave, i.e. spherical, inner rolling member surface 54 on the inner ring 48 in order to facilitate grasping with the outer spherical contour of the pivot pin 34, i.e. the roller bearing surface 44. The concave inner surface of the inner ring 48 serves for distributing the contact points between the pivot pin 34 and the inner ring 48 uniformly when the pivot pin 34 pivots in the roller 28. In particular, the ball/ball contact surface of the pivot pin 34 with the surface of the inner ring 48 serves for reducing Hertzian stresses by distributing the force over a ball/cylinder contact surface arrangement. This in turn advantageously reduces the friction and the potential shaking of the joint during operation of the vehicle.

The outer rolling member surface 56 of the outer ring 42 has the shape of a cut-off ball with substantially the same diameter as the cylindrical side walls 18, 20 of the guideways 16 of the outer joint part 12 in order to produce a single continuous contact area between the two surfaces. The ball/ball contact surface of the outer ring 42 with the opposite side walls 18, 20 of the guideways 16 distributes the force more uniformly while reducing contact stresses occurring during the operation of the joint.

FIG. 13 illustrates the problems by way of example which result during the assembly of the outer joint part 12 and the inner joint part 14 of a constant velocity pivot joint according to the invention, if it takes place, for example, in a motor vehicle assembly line. During assembly, the half shaft, which is provided with splines and with which the outer joint 12 is connected, is generally mounted in the gear unit of the motor vehicle. Then, the inner joint 14 of the constant velocity pivot joint according to the invention, i.e. the tripod star 32 with the rollers placed on the pins 34, is inserted into the outer joint 12. However, this generally gives rise to the problem of the outer ring 42 of the roller being displaced relative to the inner ring 48 under the influence of the force of gravity, as is shown in FIG. 13. Since the position of three rollers 28 has to be controlled simultaneously in such a way that they can be inserted into the raceways 16 of the outer joint 12, this task is difficult to accomplish in a mechanically efficient manner.

FIG. 14 now shows a preferred embodiment of the pivot joint 1 according to the invention in which the assembly is simplified significantly. In contrast to the situation shown in FIG. 13, in which the outer ring 42 of the roller 28 only comprises one displacement stop 10 oriented towards the center of the tripod star 32, the outer ring 42 in this case comprises on its radially outer end on its inner raceway an annular groove 9 into which a spring ring 11a is inserted. This spring ring 11a is inserted after the roller 28 consisting of the inner ring 48, the outer ring 42 and the rolling members 46 was assembled, inserted into the annular groove 9, and secures the roller 28 against falling apart. Moreover, it becomes clear from FIG. 14 that the second displacement stop significantly limits the axial displacement of the outer ring 42 relative to the inner ring 48 under the influence of the weight, so that only small positional corrections of the outer ring 42 are required so that the roller 28 can be inserted into the raceway 16 of the outer joint. Moreover, it is clearly apparent from FIG. 14 that the distance D between the displacement stops 11 and 12 is significantly larger than the length L of the roller members 46; preferably, the distance d is greater than the length L by 25 to 100%, in the present case by about 50%.

Instead of as the above-mentioned spring ring, which is inserted into an annular groove 9, the second displacement stop 11 can also be designed as a simple disk which is supported on an inner shoulder. On the outside, the disk is mechanically fixed on the outer ring 42 by the latter being beaded or caulked.

FIG. 15 shows an alternative embodiment of a constant velocity pivot joint according to the invention which differs from the embodiment of FIG. 14 only in the relative arrangement of the first and second displacement stops 10, 11. It is apparent from FIG. 15 that the outer displacement stop is now formed as an annular offset 11' configured integrally with the outer ring of the bearing 42. In the exemplary embodiment according to FIG. 14, the inner displacement stop 10 is in contrast configured as a spring ring 10' which was inserted into the groove 9 subsequent to an assembly of the roller 28, thus securing the roller 28 against falling apart.

Figure 16:
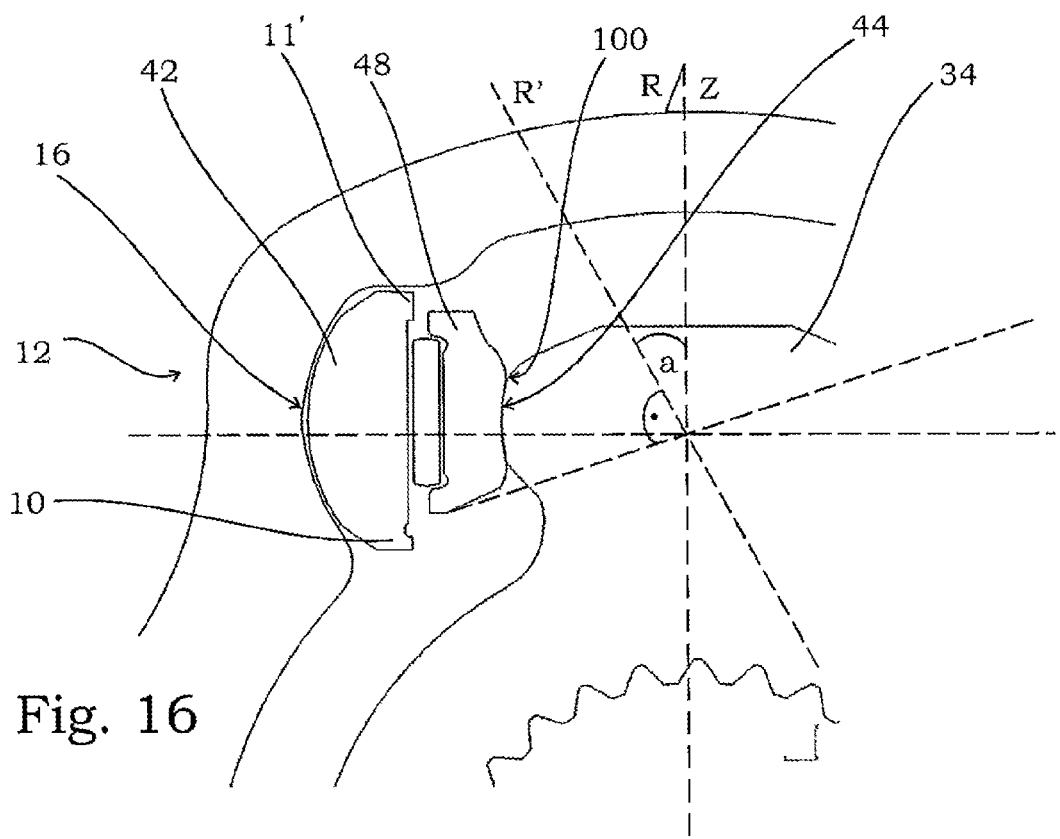
FIG. 16 shows a schematic representation of a first preferred development of a constant velocity pivot joint according to the invention with a tilt-limited roller.

FIG. 16 now shows a preferred development of the constant velocity pivot joint according to the FIG. 14 or 15, which, in addition to the limitation of the axial displaceability of the outer ring 42 of the roller 28 relative to the inner ring 48 by means of two displacement stops 10 and 11, which in this case are integrally formed with the outer ring 42, comprises a means which detachably fixes the inner ring 48 of the roller 28 in a defined angular position relative to the pin axis Z of the pin 34. This fixation primarily serves to prevent the tilting of the rollers 28 on the pins 34 of the tripod star 32 when the inner joint 14 of the constant velocity pivot joint 1 according to the invention is mounted in the outer joint 12. In the embodiment of the constant velocity pivot joint shown in FIG. 16, point-shaped deformations were produced for this purpose, for example by means of mechanical center-punching, i.e. local plastic deformation of the roller bearing surface 44, on the outer end of the roller bearing surfaces 44 on each roller bearing surface 44 after the roller 28 has been placed on the pin 34. These point-shaped deformations 100 constitute a mechanical barrier for the inner ring 48 of the roller 28 against tilting from the rest position. In the exemplary embodiment according to FIG. 16, the axis of rotation R of the roller 28 just about coincides with the pin axis Z in the rest position. The point-shaped deformation 100 prevents the tilting of the roller 28 in the manner indicated schematically in FIG. 16 by the tilted axis of rotation R'. Since the angular position of the roller 28 on the pin 34 of the tripod star 32 is fixed by the point-shaped deformations 100, a particularly simple assembly of the inner joint part 14 in the outer joint part 12 is possible. For this purpose, the rest position of the roller 28 on the pin 34 is advantageously set in such a way that the orientation of the roller 28 on the pin 34 substantially corresponds to the alignment of the raceways 14 aligned in the circumferential direction in the outer joint part. After the inner joint part 14 of the constant velocity pivot joint 1 according to the invention has been inserted into the outer joint 12, by tilting the axis of rotation of the inner joint part relative to the axis of rotation of the outer joint part 12, the mechanical barrier against tilting of the rollers 28 on the pins 34 can be overcome by causing a new plastic deformation of the roller bearing surface 44 in the area of the bottom-shaped deformation 100. Thereafter, a tilting of the rollers 28 on the pin 34 is possible practically without force.

Figure 17:
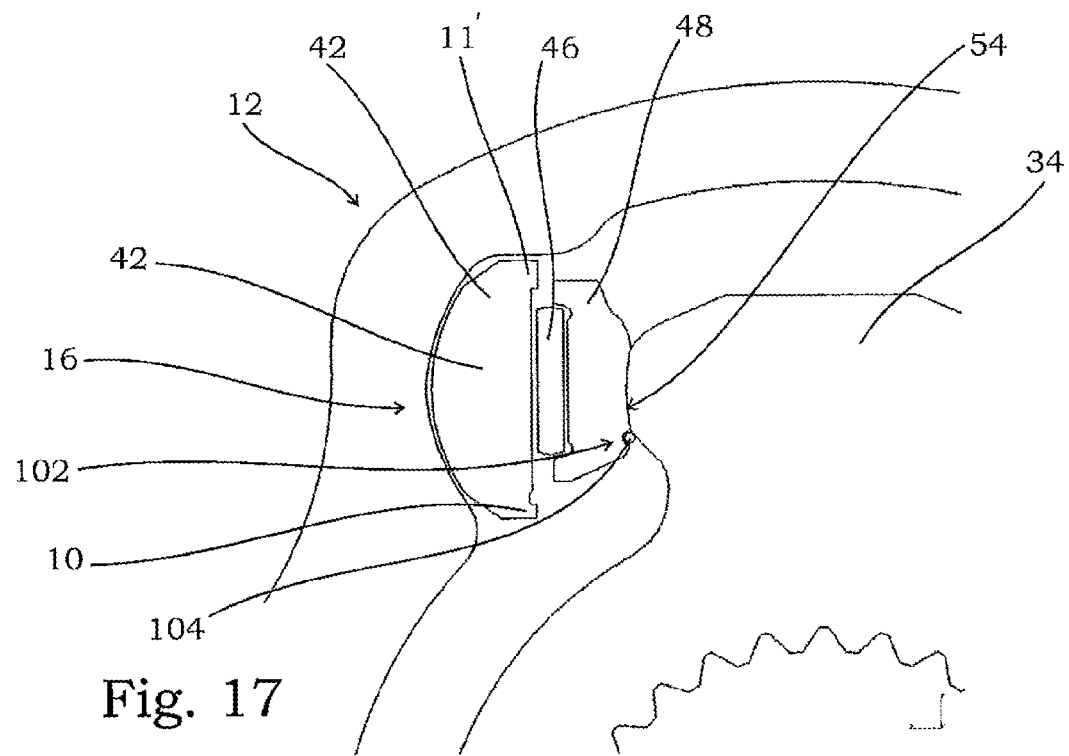
FIG. 17 shows a schematic representation of a second preferred development of a constant velocity pivot joint according to the invention with a tilt-limited roller.

Finally, FIG. 17 shows another advantageous embodiment of a constant velocity pivot joint according to the invention with a tilting protection of the type according to the invention for the rollers 28 mounted on the pin 34 of the tripod star 32. Instead of a point-shaped mechanical deformation 100 on the roller bearing surface 44 of the pins 34, the exemplary embodiment according to FIG. 17 comprises an annular groove at the inner end of the spherical inner roller surface 54. A spring ring 104, which cooperates with an edge in the surface of the pin 34 that is not shown in more detail in FIG. 17, is inserted into this annular groove 102. When the spring ring 104 comes to rest against this edge, it thus defines the rest position of the inner ring 48 placed on the pin 34. In order to tilt the axis of rotation R of the roller 28 from this rest position, an elastic deformation of the spring ring 104 inserted into the annular groove 102 is required so that a defined tilting moment has to be applied to the axis of rotation R of the roller 28 in order to tilt it from the rest position indicated in FIG. 17. It is possible in principle to leave the spring ring 104 in place after the final assembly of the inner joint part 14 in the outer joint part 12 if no tilting moments have to be overcome in this case that are too large. However, the wear that occurs can be minimized by removing the spring ring 104 from the annular groove 102 after the constant velocity pivot joint 1 according to the invention has been assembled on the motor vehicle assembly line.

What is not shown in the Figures is another possible improvement of the constant velocity pivot joint known from DE 103 25 116 A1. For it is possible to provide, at the open end of the outer joint part 12, inclined portions on the guideways 16, which make it easier to thread in the rollers 28 of the inner joint part 14 during the assembly, in that they catch the outer rings even at a certain axial displacement of the outer rings 42 relative to the inner rings and guide them into the guideways 16.

Various exemplary embodiments of the invention were explained above. However, the invention is not limited thereto, but is open to numerous alterations and modifications, in particular in accordance with the equivalent embodiment according to claim 7.

| Reference numerals | |
| --- | --- |
| 1 | Constant velocity pivot joint |
| 9 | Annular groove |
| 10 | Inner displacement stop |
| 11 | Outer displacement stop |
| 12 | Outer joint part |
| 14 | Inner joint part |
| 16 | Guideway |
| 18 | Side wall |
| 20 | Side wall |
| 22 | End face |
| 24 | Middle section |
| 26 | Shoulder surface |
| 28 | Roller |

-continued

| Reference numerals | |
|---|---|
| 28 | Roller |
| 30 | Axle pin |
| 32 | Spider body |
| 34 | Pivot pin |
| 36 | Surface section |
| 38 | Spherical central area |
| 40 | Upper/lower curved area |
| 42 | Outer ring |
| 44 | Roller bearing surface |
| 46 | Rolling member |
| 48 | Inner ring |
| 50 | Lower flange |
| 52 | Upper flange |
| 54 | Inner roller surface |
| 56 | Outer roller surface |
| 100 | Point-shaped deformation |
| 102 | Annular groove |
| 104 | Spring ring |

The invention claimed is:

1. Constant velocity pivot joint, comprising
a) an outer joint part with three guideways distributed over the circumference and extending in the axial direction,
b) an inner joint part with three pivot pins, which are distributed over the circumference and extend in the radial direction, and which are provided to come into engagement with the guideways, and which form roller bearing surfaces,
c) and rollers disposed between the outer joint part and the inner joint part, each of the rollers comprising
  i) an inner ring with an inner roller surface, the shape of which is adapted to the roller bearing surfaces of the pivot pins in such a way that a pivot pin of the inner joint part inserted into the inner ring can execute a tilting movement therein, but not a linear displacing movement,
  ii) and an outer ring with an outer roller surface, the shape of which is adapted to the guideways of the outer joint part in such a way that an outer ring inserted into a guideway can execute a roll-off movement therein,
  iii) a plurality of rolling members being disposed between the inner ring and the outer ring so that the outer ring can roll off on the inner ring,
  iv) the inner ring forming an axial guide, which fixes the position of the rolling members relative to the inner ring in the axial direction,
  v) the inner ring and the outer ring being axially displaceable relative to each other, wherein
  vi) the outer ring forms an inner displacement stop and an outer displacement stop which extend in the radial direction inwardly and which limit the roll-off movement of the rolling members on the inner surface of the outer ring in the axial direction, and
  vii) a displacement stop does not reach over the outer contour of the inner ring.

2. Constant velocity pivot joint according to claim 1, wherein at least one of the inner displacement stop and the outer displacement stop is formed integrally with the outer ring.

3. Constant velocity pivot joint according to claim 2, wherein the displacement stop formed integrally with the outer ring is formed as an annular contact shoulder.

4. Constant velocity pivot joint according to claim 3, wherein the annular contact shoulder was formed prior to the completion of processing of the outer ring.

5. Constant velocity pivot joint according to claim 3, wherein the annular contact shoulder was formed subsequent to the completion of processing of the outer ring.

6. Constant velocity pivot joint according to claim 1, wherein the inner ring is formed in a single piece.

7. Constant velocity pivot joint according to claim 1, wherein the distance (D) of the displacement stops is greater than the length (L) of the rolling members.

8. Constant velocity pivot joint according to claim 1, wherein at least one of the inner displacement stop and the outer displacement stop is formed as a separately formed circlip.

9. Constant velocity pivot joint according to claim 1, wherein each inner ring supported on a pivot pin has a rest position in which the inner ring is mechanically fixed in a defined angular position relative to the pin axis.

10. Constant velocity pivot joint according to claim 1, wherein the inner ring forms an inner displacement stop and an outer displacement stop which extend in the radial direction outwardly and which limit the roll-off movement of the rolling members on the outer surface of the inner ring in the axial direction.

11. Constant velocity pivot joint according to claim 10, wherein at least one of the inner displacement stop and the outer displacement stop (11) is formed integrally with the inner ring.

12. Constant velocity pivot joint according to claim 11, wherein the displacement stop formed integrally with the inner ring is formed as an annular contact shoulder.

13. Constant velocity pivot joint according to claim 12, wherein the annular contact shoulder was formed prior to the completion of processing of the inner ring.

14. Constant velocity pivot joint according to claim 12, wherein the annular contact shoulder was formed subsequent to the completion of processing of the inner ring.

15. Constant velocity pivot joint according to claim 10, wherein at least one displacement stop does not reach over the inner contour of the outer ring.

16. Constant velocity pivot joint according to claim 10, wherein the inner ring is formed in a single piece.

17. Constant velocity pivot joint according to claim 10, wherein the distance (D) of the displacement stops is greater than the length (L) of the rolling members.

18. Constant velocity pivot joint according to claim 10, wherein at least one of the inner displacement stop and the outer displacement stop is formed as a separately formed circlip.

19. Constant velocity pivot joint according to claim 10, wherein each inner ring supported on a pivot pin has a rest position in which the inner ring is mechanically fixed in a defined angular position relative to the pin axis.

* * * * *